SUBSCRIPTION TELEVISION ENCODING APPARATUS

Filed Feb. 1, 1954 4 Sheets-Sheet 1

GEORGE V. MORRIS
INVENTOR.
BY Francis W. Crotty
HIS ATTORNEY.

Dec. 30, 1958 G. V. MORRIS 2,866,961

SUBSCRIPTION TELEVISION ENCODING APPARATUS

Filed Feb. 1, 1954 4 Sheets-Sheet 2

SUBSCRIPTION TELEVISION ENCODING APPARATUS

Filed Feb. 1, 1954 4 Sheets-Sheet 3

GEORGE V. MORRIS
*INVENTOR.*

BY Francis W. Crotty

HIS ATTORNEY.

Dec. 30, 1958 G. V. MORRIS 2,866,961
SUBSCRIPTION TELEVISION ENCODING APPARATUS
Filed Feb. 1, 1954 4 Sheets-Sheet 4

GEORGE V. MORRIS
*INVENTOR.*
BY Francis W. Crotty
HIS ATTORNEY.

2,866,961

SUBSCRIPTION TELEVISION ENCODING APPARATUS

George V. Morris, Chicago, Ill., assignor to Zenith Radio Corporation, a corporation of Delaware Application February 1, 1954, Serial No. 407,192

20 Claims. (Cl. 340—147)

This invention relates to subscription television systems in which a television signal is transmitted in coded form to be utilized only in subscriber receivers having appropriate decoding apparatus actuated in accordance with the coding schedule employed at the transmitter. This is a continuation-in-part of copending application Serial No. 338,033, filed February 20, 1953, in the name of George V. Morris, now abandoned, and assigned to the present assignee.

Subscription television systems have been proposed in which a television signal is coded in accordance with a selected coding schedule at the transmitter, and in which a key signal indicating the coding schedule of the telecast is made available to subscriber receivers, being disseminated, for example, over a signal channel such as a closed wire circuit. Systems of this general type are disclosed and claimed in Patent 2,510,046, issued May 30, 1950 in the name of Alexander Ellett et al. and in Patent 2,547,598 issued April 3, 1951 in the name of Erwin M. Roschke, both of which are assigned to the present assignee.

The use of a closed wire circuit for distributing the key signal to subscriber receivers is advantageous in that it provides maximum secrecy and facilitates the assessment of subscription fees. Nevertheless, the key signal may be transmitted as a modulation component of the coded television signal itself or it may be sent over any other ether channel. However, if the key signal is transmitted by air in unaltered form, the coding schedule of the telecast may be too easily appropriated by unauthorized persons for decoding purposes. Copending application Serial No. 281,418, filed April 9, 1952 in the name of George V. Morris et al., entitled "Subscription Television System" and assigned to the present assignee, discloses and claims one form of subscription television system in which an air-borne key signal is distributed to subscriber receivers but it conveys coding information in transposed form so that a compensating transposition must be made at the receivers by means of a transposition mechanism, which may comprise a series of toggle switches, before it may be used for decoding purposes. Such a coded key signal may be distributed as a modulation component of the coded television signal without any great possibility of its being used by unauthorized receivers. The specific embodiments of the Morris et al. application effect mode changes of the television system and accomplish encoding in response to pulses that are selected, in accordance with an encoding schedule, in each of a series of mode-determining intervals in which there is a determination of operating mode.

In copending application Serial No. 326,107, filed December 15, 1952, and issued Feb. 11, 1958, as Patent No. 2,823,252, in the name of Jack E. Bridges, entitled "Subscription Television System" and assigned to the present assignee, there is disclosed and claimed another subscription television system featuring an air-borne key signal. In that system a combination of encoding signal components, individually having a predetermined identifying characteristic such as frequency, is transmitted to subscriber receivers along with the composite video signal. These components which are, preferably, randomly-sequenced and randomly-appearing within the combination, are derived from the video signal at the receiver and by means of suitable filters are segregated from one another for application over assigned input circuits to a transposition mechanism. The mechanism may employ a family of toggle switches and selectively establishes a multiplicity of circuit conditions between these input circuits and a plurality of output circuits, which are connected to various input circuits of a multi-stable actuating device such as a bi-stable multivibrator. With this arrangement, the coding signal components may be applied to the actuating device input circuits in a prescribed sequence to operate this device from one to another of its stable operating conditions. Mode changes occur in the television system by varying the relative timing of the video and synchronizing components of the television signal in response to amplitude changes in the actuator and in this manner the operating mode is changed at irregular or random intervals.

The code techniques of the described arrangements are very effective and do permit the use of an air-borne code conveying signal while preserving an adequate degree of secrecy. However, it is desired to improve the secrecy aspects, as contributed by the transposition mechanism, of subscription television systems of the general type disclosed by Morris et al. and Bridges in order to eliminate or minimize any unauthorized utilization or pirating of a subscription telecast. To that end, the present application discloses a novel transposition arrangement for incorporation into such subscription television systems which is capable of establishing an extremely large number of code combinations, and yet is easy to operate and relatively economical to produce.

It is, accordingly, an object of the present invention to provide an encoding apparatus for a subscription television system which includes an improved transposition mechanism to enhance the secrecy aspects of the system.

It is another object of the invention to provide such an improved transposition mechanism that lends itself readily to mass production techniques on an economical basis.

It is still another object of the invention to provide such an improved mechanism that is relatively simple to operate in view of its coding capabilities.

An encoding apparatus for a subscription television system, in accordance with the invention, includes a plurality of input circuits and a plurality of output circuits. The apparatus has a plurality of transition switches, individually having a plurality of operating positions, connected to the input circuits and to the output circuits and in each of the positions establishing predetermined circuit conditions between selected ones of the input and output circuits. The apparatus also comprises a plurality of transposition switches individually having a plurality of operating positions, and uni-control mechanism for concurrently operating each of the transposition switches with an assigned one of the transition switches. A plurality of continuous circuit connections are employed in the encoding apparatus each of which includes at least one of the transposition switches in series with at least one of the transition switches between the input and output circuits to modify the aforesaid predetermined circuit conditions in accordance with the transposition pattern of the transposition switches.

The features of this invention which are believed to be new are set forth with particularity in the appended claims. The invention, together with further objects and advantages thereof, may best be understood, however, by reference to the following description in conjunction with the accompanying drawings, in which:

The encoding apparatus of the invention is shown and hereinafter described as employed in the system disclosed in the aforementioned Bridges application, but it will be readily apparent that with only very simple modifications this apparatus may be used in the aforementioned Morris et al. case or for that matter in any one of the prior systems that include a transposition mechanism of some type. To name a few, the present invention is suitable for incorporation into the systems of copending application Serial No. 310,309, filed September 18, 1952, in the name of Alexander Ellett, entitled "Subscriber Television System," copending application Serial No. 315,457, filed October 18, 1952, in the name of Erwin M. Roschke, entitled "Subscription Television System," and copending application Serial No. 327,576, filed December 23, 1952, in the name of Robert Adler entitled "Subscription Television System," all of which are assigned to the present assignee.

Figure 1:
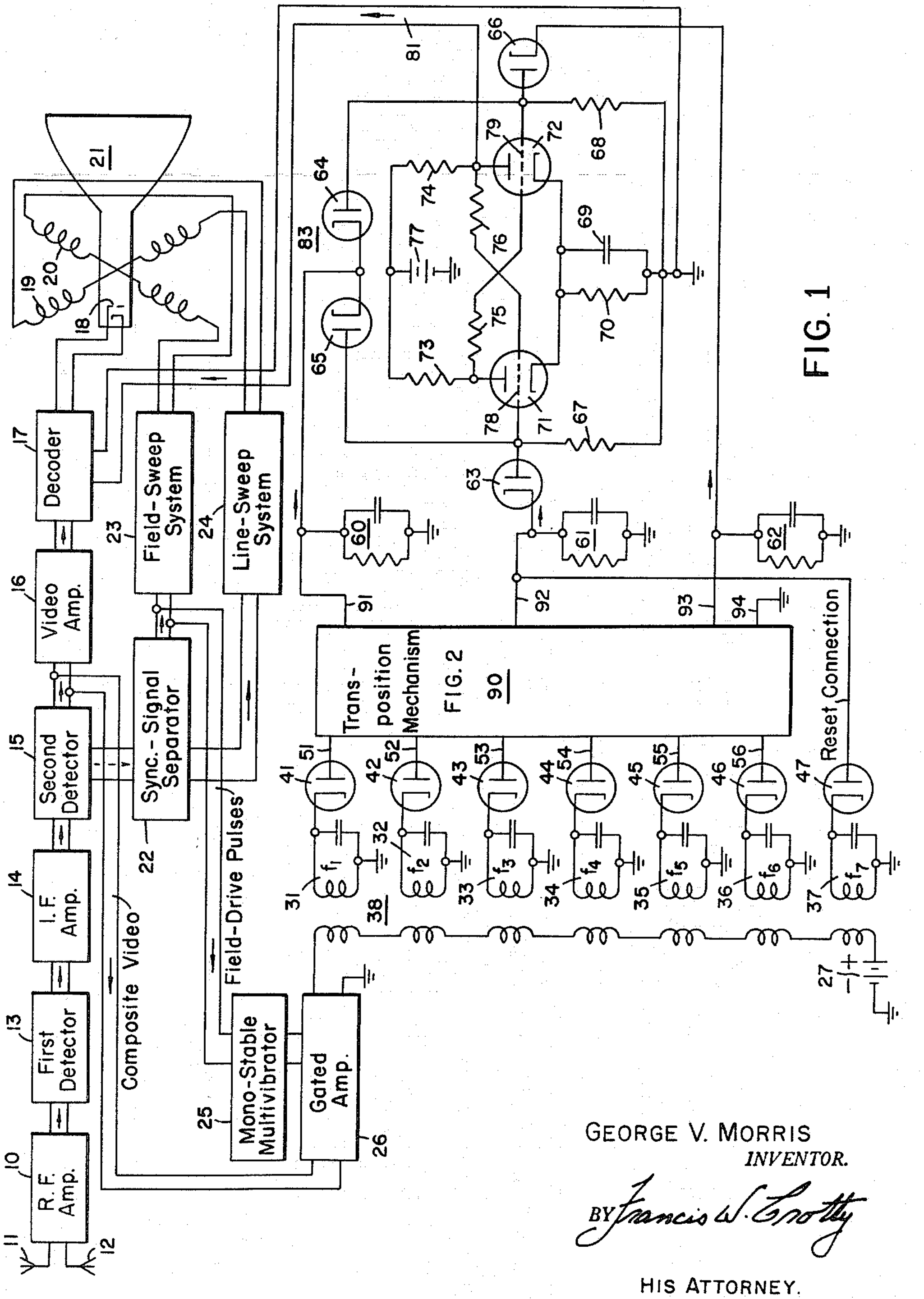
Figure 1 is a schematic diagram of a subscription television receiver including an encoding apparatus constructed in accordance with the invention.

The receiver of Figure 1, which may utilize a telecast originating at a transmitter constructed in accordance with the aforementioned disclosure by Bridges, comprises a radio-frequency amplifier 10 having input terminals connected to an antenna circuit 11, 12 and output terminals connected to a first detector 13, the output terminals of the detector being connected to an intermediate-frequency amplifier 14. The output terminals of the intermediate-frequency amplifier are connected through a second detector 15 to a video amplifier 16 which, in turn, is coupled through a decoder 17 to the input electrodes 18 of a cathode-ray image reproducing device 21. Decoder 17 may be similar to that disclosed and claimed in copending application Serial No. 243,039, filed August 22, 1951, and issued August 7, 1956 as Patent 2,758,153, in the name of Robert Adler, entitled "Subscription Television System" and assigned to the present assignee. It may comprise a beam-deflection tube having a pair of output circuits which may be selectively coupled into the video channel as the electron beam thereof is deflected from one to the other of two segmental anodes coupled to such output circuits in synchronism with the mode changes of the transmitted signal. One of these circuits includes a time-delay network so that the variations in the timing of the video components relative to the synchronizing components of the received television signal may be compensated effectively to decode the television signal as the beam of the deflection tube is switched between its anodes. This switching effect is accomplished by means of a beam-deflection control or actuating signal applied to decoder 17, as explained hereinafter.

Second detector 15 is also coupled to a synchronizing-signal separator 22 which is coupled in turn to a field-sweep system 23 and to a line-sweep system 24. The output terminals of sweep systems 23 and 24 are connected respectively to field-deflection elements 20 and line-deflection elements 19 associated with reproducing device 21.

In an illustrative embodiment of the system, the encoding signal and an associated reset signal may comprise seven bursts of various signal frequencies which are individually transmitted between the line-drive pulses superimposed on the vertical-blanking pulse, as explained in the aforesaid Bridges application. In order to facilitate the separation of these signal components it is desirable to provide circuitry which will "gate in" only that portion of the composite video signal containing such components. To that end, field-drive pulses are derived from synchronizing-signal separator 22 and supplied to a monostable multivibrator 25 having output terminals connected to a normally-closed gated amplifier 26. The output terminals of second detector 15 are also connected to gated amplifier 26 to supply the composite video signal thereto, and the output circuit of this amplifier is completed through a sectionalized primary winding of a transformer 38 to the positive terminal of a source of unidirectional operating potential, here shown as a battery 27 the negative terminal of which is connected to ground. A series of secondary windings of the transformer constitute the inductive branches of a series of frequency-selective tuned circuits 31–37, individually resonant at a particular one of the seven frequencies employed in coding. Selectors 31 to 36 are connected by means of associated diode rectifiers 41–46 to a group of input circuits 51–56 of a transposition mechanism 90 while selector 37 is directly connected via a reset connection to a parallel resistance-capacitance load circuit 61.

As far as the technique of coding is concerned, the transposition mechanism is provided merely for the purpose of selectively connecting any one of input circuits 51–56 to any one of four output circuits 91–94. If the various interconnections established by mechanism 90 are identical to the inter-connections established by a similar transposition mechanism in the encoding apparatus at the transmitter, decoding will be effected. The mechanism setting information is disseminated only to authorized subscribers and a suitable charge may, of course, be assessed for such information.

Figure 3:
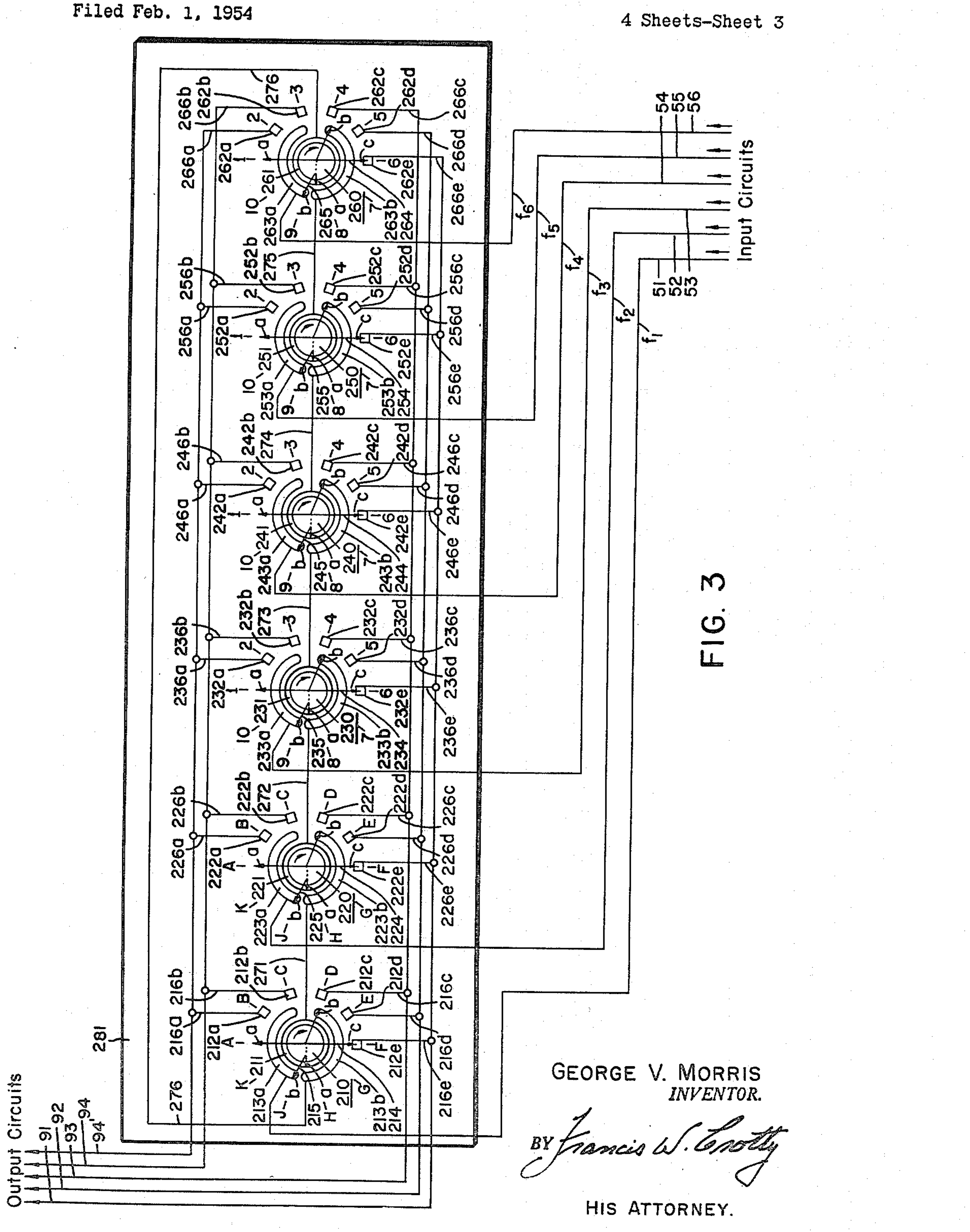
Figure 3 is a plan view, partly schematic, of another embodiment of the transposition mechanism.
Figure 4:
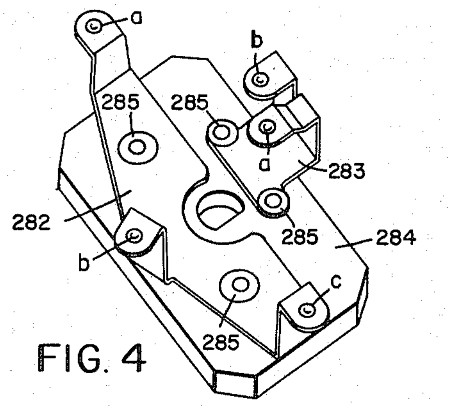
Figure 4 is a perspective view of a movable switch contact assembly useful in the embodiment shown in Figure 3.
Figure 5:
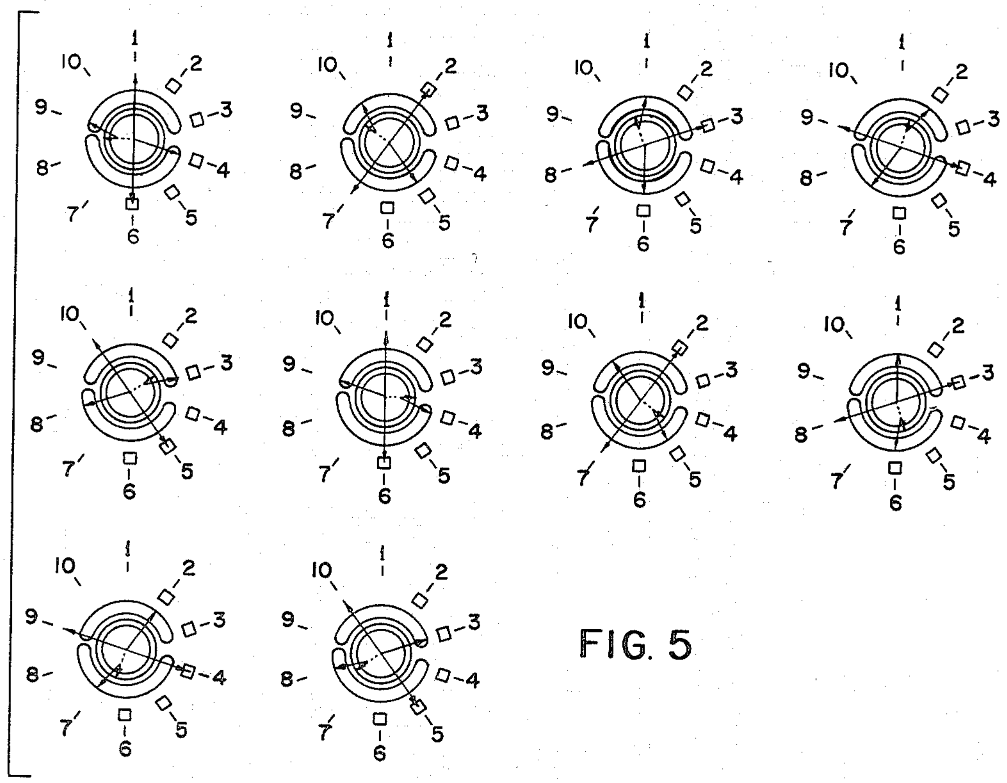
Figure 5 is a schematic diagram illustrating one of the features of the embodiment shown in Figure 3.

While a simple switching apparatus, such as a series of four-position rotary switches or a toggle switch arrangement as illustrated in the copending Bridges application, may be employed to effect the required inter-connections, it is desirable to provide a transposition mechanism that not only is simple to set up but also adds a considerable degree of security against unauthorized interception of the decoding information. Two different embodiments of a transposition mechanism constructed in accordance with the invention, shown in Figure 2 and in Figures 3, 4 and 5, are described in detail hereinafter.

Output circuits 91–93 are connected respectively to three parallel resistance-capacitance load circuits 60–62 while output circuit 94 is connected to a point of reference potential such as ground. Load circuit 60 is connected through a pair of isolating diodes 65, 64 to the control electrodes 78, 79 of a pair of electron-discharge devices 71, 72, respectively, of an actuator 83. The actuating device as illustrated may take the form of a well-known bi-stable multivibrator which has two stable operating conditions. Control electrodes 78 and 79 are connected to ground through resistors 67 and 68, respectively. Load circuits 61 and 62 are also connected to control electrodes 78, 79 through isolating diodes 63 and 66, respectively. The anode of device 71 is cross-coupled to the control electrode 79 of device 72 through a resistor 75, and the anode of device 72 is cross-coupled to the control electrode 78 of device 71 through a resistor 76. The anodes of devices 71 and 72 are also connected through resistors 73 and 74, respectively, to a source of positive unidirectional operating potential, here shown as a battery 77, and the cathodes of devices 71 and 72 are connected together and through the parallel combination of a resistor 70 and a capacitor 69 to a ground connection. The anode of device 72 is connected to decoder 17 via conductors 81 to provide an actuating or deflection control signal therefor. With such an arrangement, multivibrator 83 may be actuated to one of its operating conditions in response to pulses applied thereto over the input circuit including load circuit 61, actuated to the other one of its operating conditions responsive to applied pulses over the input circuit including load circuit 62, and actuated from its instantaneous condition to its alternate condition in response to applied pulses over the input circuit including load circuit 60.

Inasmuch as a complete description of the coding technique is included in the copending Bridges application and since the coding technique itself forms no part of the present invention, the operation of the receiver of Figure 1 will be described briefly. In operation, the coded television signal is intercepted by antenna circuit 11, 12, amplified in radio-frequency amplifier 10 and heterodyned to the selected intermediate frequency of the receiver in first detector 13. The resulting intermediate-frequency signal is amplified in intermediate-frequency amplifier 14 and detected in second detector 15 to produce a composite video signal. This latter signal is amplified in video amplifier 16, passed through decoder 17, and impressed on the input electrodes 18 of image-reproducing device 21 to control the intensity of the cathode-ray beam of the device in well-known manner.

The synchronizing components are separated in separator 22, the field-synchronizing components being utilized to synchronize sweep system 23 and, hence, the field scansion of image-reproducing device 21, whereas the line-synchronizing components are utilized to synchronize sweep system 24 and, therefore, the line scansion of device 21. Of course, the sound-modulated carrier received along with the video carrier is translated in the usual way through an audio system which has been omitted from the drawings for the purpose of simplicity.

Field-drive pulses from separator 22 are supplied to mono-stable multivibrator 25 to produce a gating pulse for normally-closed gated amplifier 26. The parameters of the multivibrator are so chosen as to overlap, in point of time, that portion of the field-retrace interval of the composite video signal which includes the reset pulse and the other encoding signal pulses. The composite video signal is continuously applied to the input circuit of amplifier 26, but only the information contained during the interval of the gating pulse is translated to the primary winding of transformer 38. Amplifier 26 is thus "open" during the times the signal bursts of various frequencies, representing the combination of coding signal pulses, are received and since selector circuits 31–37 are individually tuned to an assigned one of these frequencies, such bursts are separated out from the composite video signal and from each other. Each time a burst of signal frequency occurs in the encoding signal combination, it is channeled over a corresponding input circuit 51–56 to one of the output circuits 91–94 for selective application to one of the input circuits of bi-stable multivibrator 83, or, in the case of output circuit 94, directly to ground.

The encoding apparatus at the transmitter preferably is identical to that described at the receiver so if the various switch elements are adjusted to the same setting as the corresponding transposition mechanism at the transmitter, the input circuits of bi-stable actuating device 83 receive pulses similar to those received by the input circuits of a corresponding bi-stable actuating device at the transmitter. Actuator 83 therefore produces an actuating or deflection control signal for decoder 17 identical in wave form to that developed at the transmitter for coding the television signal initially. Decoder 17 consequently operates in time synchronism with a similar coder at the transmitter so that the signal applied to the input electrodes 18 of image-reproducing device 21 is suitably compensated to effect intelligible image reproduction.

Figure 2:
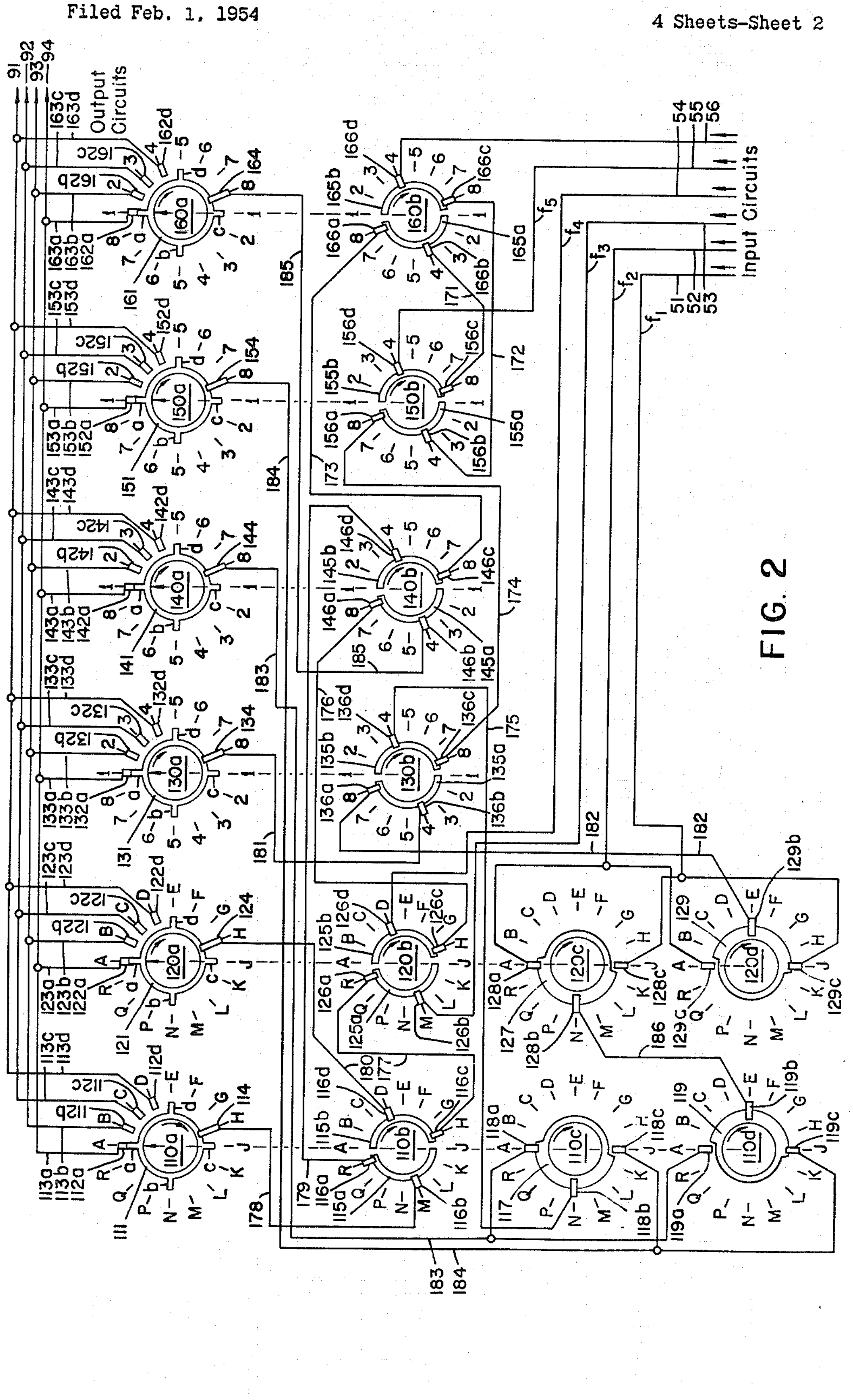
Figure 2 is a schematic representation of one embodiment of the transposition mechanism which may be incorporated into the encoding apparatus shown in Figure 1.

In the illustrated embodiment of the invention shown in Figure 2, there is provided a plurality of transition switches which individually have a plurality of operating positions. Preferably, these transition switches take the form of manually-operated 16-point wafer switch assemblies **110*a*, 120*a*, 130*a*, 140*a*, 150*a*, 160*a* each switch assembly having a movable element (111, 121, 131, 141, 151, 161**, respectively) with four equally spaced contacts *a*, *b*, *c*, and *d* disposed about its periphery. Each one of the transition switches **110*a*–160*a* has a series of stationary contacts (112*a*–112*d*, 122*a*–122*d*, 132*a*–132*d*, 142*a*–142*d*, 152*a*–152*d*, 162*a*–162*d*, respectively) connected by way of conductors 113*a*–113*d*, 123*a*–123*d*, 133*a*–133*d*, 143*a*–143*d*, 153*a*–153*d*, 163*a*–163*d*, respectively to common output circuits 94, 93, 92, 91**. The stationary elements and contacts *a–d* of the movable element of each transition switch are so arranged that each contact sequentially engages each of the stationary elements as the movable element of the switch is turned through one complete revolution. As presently to be described, these transition switches by way of movable elements 111, 121, 131, 141, 151, 161, are indirectly connected to input circuits 51–56 and in each of the various positions establish predetermined circuit conditions between selected ones of these input circuits and output circuits 91–94.

The encoding apparatus additionally comprises a plurality of transposition switches which also individually have a plurality of operating positions. Preferably, these transposition switches are also of the 16-point wafer switch type, **110*b*, 120*b*, 130*b*, 140*b*, 150*b*, 160*b*, and each switch comprises two semicircular movable elements 115*a*—115*b*, 125*a*—125*b*, 135*a*—135*b*, 145*a*—145*b*, 155*a*—155*b*, 165*a*—165*b*, respectively. Equally spaced stationary elements 116*a*–116*b*, 126*a*–126*d*, 136*a*–136*d*, 146*a*–146*d*, 156*a*–156*d*, 166*a*–166*d*, are respectively provided for transposition switches 110*b*–160*b***, and are so arranged about the peripheries of the movable elements that every quarter revolution establishes a different inter-connection of the stationary elements.

Uni-control mechanism is provided for concurrently operating each of the transposition switches with an assigned one of the transition switches. In the illustrated embodiment, this mechanism comprises a series of common switch shafts for mechanically inter-connecting transition wafer switch **110*a* with transposition wafer switch 110*b*, switch 120*a* with switch 120*b*, switch 130*a* with switch 130*b*, switch 140*a* with switch 140*b*, switch 150*a* with switch 150*b*, and switch 160*a* with switch 160*b*, as indicated by the broken lines between such pairs. With this arrangement, when any one of the transition switches is manually adjusted, a repositioning of its associated transposition switch is effected to possibly establish different inter-connections between the stationary elements, depending on the degree of rotation of the operated transition switch. For example, if switch 140*a* is rotated to position seven a different pattern of interconnections will be established as between stationary contacts 146*a*–146*d*** from that as illustrated.

Additional transposition switches **110*c* and 110*d* are also uni-controlled by transition switch 110*a* while further transposition switches 120*c* and 120*d* are also ganged with transition switch 120*a*. Switches 110*c* and 120*c* are provided with movable cam-shaped elements 117, 127 and stationary elements 118*a*–118*c*, 128*a*–128*c*, respectively. Elements 118*b* and 128*b* are adapted to establish a continuous electrical connection with movable elements 117 and 127, respectively, while contacts 118*a*, 118*c* and 128*a*, 128*c*** are disposed about the peripheries of their associated movable elements so that each of these contacts is electrically connected to its movable element for one-half revolution while the other contact is connected during the other half revolution.

Transposition switches **110*d* and 120*d* are provided with movable cam-shaped elements 119, 129 and stationary elements 119*a*–119*c*, 129*a*–129*c***, respectively.

Elements 119*b* and 129*b* are adapted to establish a continuous electrical connection with movable elements 119 and 129, respectively, while contacts 119*a*, 119*c* and 129*a*, 129*c* are disposed about the peripheries of their associated movable elements so that each of these contacts is electrically connected to its movable element for one-half revolution with the other contact being connected during the other one-half revolution.

Various electrical connectors are provided in the encoding apparatus for connecting the transposition switches into circuit relation with the transition switches between the input and output circuits to modify the predetermined circuit conditions established by the transition switches in accordance with the transposition pattern of the transposition switches. In the illustration, these connections include a connection 171 between stationary elements 166*b* and 156*c*, a connection 172 from stationary element 166*c* to stationary element 156*b*, a connection 173 between stationary contacts 166*a* and 146*c*, a connection 174 between stationary contacts 156*a* and 136*c*, a connection 175 from stationary contact 136*d* to stationary contact 118*b*, a connection 176 from contact 126*c* to contact 146*a*, a connection 177 from contact 116*c* to contact 126*a*, a connection 178 from stationary element 116*b* to stationary element 114, a connection 179 from contact 116*a* to contact 146*d*, a connection 180 between stationary contacts 116*d* and 124, a connection 181 from contact 136*b* to contact 134, a connection 182 from stationary element 136*a* to stationary contact 129*b*, a connection 183 from contacts 119*a* and 118*a* to contact 144, a connection 184 from stationary contacts 118*c* and 119*c* to stationary element 154, a connection 185 between stationary contact 146*b* and stationary element 164, and a connection 186 between stationary contacts 119*b* and 128*b*.

For convenience the transposition switches have been shown connected to the input circuits and the transition switches connected to the output circuits, but it will become apparent that similar results may be achieved if the transition switches are connected to the input circuits and the transposition switches to the output circuits.

Because of the commercial advantages of employing 16-point switches, they have been shown for switch assemblies 130*a*, 140*a*, 150*a*, and 160*a*, even though only eight positions are actually required in the illustrated embodiment. The positioning numbers or indicia on the face of these switch assemblies are repeated and the stationary and movable elements are so arranged that it makes no difference, as far as the function of the transposition mechanism is concerned, what series of indicating numbers the subscriber uses at any time. The various positions of switch assemblies 110*a* and 120*a* are preferably indicated by letters in order to avoid the use of two-digit numbers, since all sixteen positions of these switches are employed. Moreover, the letter designation of the first two assemblies facilitates the use of a letter-number combination to indicate the switch settings, such a combination being very similar to a telephone number. Needless to say, most prospective subscribers to a subscription television service are accustomed to operating a dial on a telephone and would have little or no difficulty in setting up each component switch assembly of the transposition mechanism in accordance with the particular combination for a given program.

In describing the operation of the invention, it may be convenient to consider a few illustrative switch settings. As the mechanism is shown in Figure 2, all of the various switch assemblies are adjusted to their first or home positions. That is, if a subscriber were assigned a code combination of AA 1111, he would set up his encoding apparatus as shown. In these positions, interconnections are established from input circuits 51–56 to transition switches 110*a*–160*a* to translate the separated bursts of signal frequency to the output circuits, in a manner now to be described.

Each time a burst of signal frequency $f_1$ occurs it is applied to movable element 131 of transition switch 130*a* over the following circuit: input circuit 51, stationary contact 129*c*, movable element 129, stationary contact 129*b*, conductor 182, stationary contact 136*a*, movable element 135*a*, stationary contact 136*b*, conductor 181, stationary contact 134 to movable contact 131. Bursts of signal frequency $f_2$ are supplied to movable element 151 of transition switch 150*a* over the following path: input circuit 52, stationary contact 128*a*, movable element 127, stationary contact 128*b*, conductor 186, stationary contact 119*b*, movable element 119, stationary contact 119*c*, conductor 184, stationary contact 154 to movable element 151. Signal components of frequency $f_3$ are supplied to movable element 121 of transition switch 120*a* over the following circuit: input circuit 53, stationary contact 126*b*, movable element 125*a*, stationary contact 126*a*, conductor 177, stationary contact 116*c*, movable element 115*b*, stationary contact 116*d*, conductor 180, stationary element 124 to movable element 121. Bursts of signal frequency $f_4$ are applied to movable element 161 of transition switch 160*a* over the following path: input circuit 54, stationary contact 126*d*, movable element 125*b*, stationary contact 126*c*, conductor 176, stationary contact 146*a*, movable element 145*a*, stationary element 146*b*, conductor 185, stationary contact 164 to movable element 161. Encoding signal components of frequency $f_5$ are impressed on movable element 111 of transition switch 110*a* over the following circuit: input circuit 55, stationary element 156*d*, movable element 155*b*, stationary contact 156*c*, conductor 171, stationary element 166*b*, movable element 165*a*, stationary contact 166*a*, conductor 173, stationary contact 146*c*, movable contact 145*b*, stationary element 146*d*, conductor 179, stationary contact 116*a*, movable element 115*a*, stationary contact 116*b*, conductor 178, stationary contact 114 to movable element 111. Finally, bursts of signal frequency $f_6$ are supplied to movable element 141 of transition switch 140*a* over the following path: input circuit 56, stationary contact 166*d*, movable element 165*b*, stationary contact 166*c*, conductor 172, stationary contact 156*b*, movable element 155*a*, stationary contact 156*a*, conductor 174, stationary element 136*c*, movable element 135*b*, stationary contact 136*d*, conductor 175, stationary element 118*b*, movable element 117, stationary element 118*a*, conductor 183, stationary contact 144 to movable element 141.

In summary, when the transposition mechanism is adjusted as illustrated in Figure 2, signal frequencies $f_5$, $f_3$, $f_1$, $f_6$, $f_2$ and $f_4$ appear at the movable elements of transition switches 110*a*, 120*a*, 130*a*, 140*a*, 150*a*, 160*a*, respectively. Of course, since the *a* contacts of movable elements 111—161 are connected respectively to the stationary elements 112*a*, 122*a*, 132*a*, 142*a*, 152*a*, 162*a*, which are connected to common output circuit 94, every signal component is channeled directly to ground. Consequently, with the switches in their "home" positions no pulses are applied to actuator 83 to effect mode changes in the television receiver and therefore such an initial position may be employed during the reception of non-subscription programs.

Assume now that the particular code combination for a certain program is CK4582. For effecting proper decoding, switch assembly 110 is manually rotated to position C, resulting in the electrical connection of movable element 111 to stationary element 112*c* over its associated *a* contact. The various interconnections as established by movable elements 115*a*, 115*b*, 117, 119 remain unchanged from those shown in Figure 2 since transition switch 110*a* has not been rotated more than a quarter turn.

Switch assembly 120 is rotated to position K, thereby establishing an electrical connection between movable element 121 and stationary element 122*b* over contact *c*, a connection between stationary elements 126*b* and 126*a* over movable element 125*b*, a connection between stationary elements 126*d* and 126*c* over movable contact 125*a*, a connection between stationary contact 128*c* and stationary contact 128*b* through movable element 127, and a connection between stationary element 129*a* and stationary contact 129*b* over movable element 129.

Switch assembly 130 is adjusted by the subscriber to position 4, thereby effecting a connection between movable element 131 and stationary element 132*d* over its associated *a* contact. The interconnections established by movable elements 135*a* and 135*b* are unchanged from those illustrated in Figure 2 inasmuch as the switch assembly has not been rotated more than one quarter turn.

Switch assembly 140 is next rotated to position 5, thereby establishing a connection from movable element 141 to stationary element 142*a* through its associated *b* contact, a connection between stationary elements 146*a* and 146*d* over movable element 145*a*, and a connection between stationary contacts 146*b* and 146*c* over movable element 145*b*.

Switch assembly 150 is adjusted to position 8, resulting in the establishment of a connection from movable element 151 to stationary element 152*d* through the *b* contact of 151, a connection between 156*a* and 156*d* over movable element 155*a*, and a connection between stationary contacts 156*b* and 156*c* over movable element 155*b*.

Finally, to complete the switch setting, assembly 160 is manually rotated to position 2, resulting in the establishment of a connection between movable element 161 and stationary contact 162*b* over contact *a* of 161. The electrical interconnections between stationary contacts 166*c* and 166*d*, and between 166*a* and 166*b*, remain as previously described.

With this particular combination, bursts of signal frequency $f_1$ are supplied to transition switch 150*a* for application to output circuit 91 over the following path: input circuit 51, stationary contact 128*c*, movable element 127, stationary element 128*b*, conductor 186, stationary element 119*b*, movable element 119, stationary contact 119*c*, conductor 184, stationary contact 154, movable element 151 and its *b* contact, stationary element 152*d*, and conductor 153*d* to output circuit 91.

Signal components of frequency $f_2$ are also supplied to output circuit 91 over the following path: input circuit 52, stationary contact 129*a*, movable element 129, stationary element 129*b*, conductor 182, stationary element 136*a*, movable element 135*a*, stationary element 136*b*, conductor 181, stationary contact 134, movable element 131 and its *a* contact, stationary element 132*d*, conductor 133*d* to output circuit 91.

Encoding components of frequency $f_3$ are supplied to output circuit 93 over the following circuit: input circuit 53, movable contact 126*b*, movable element 125*b*, stationary contact 126*a*, conductor 177, stationary contact 116*c*, movable element 115*b*, stationary element 116*d*, conductor 180, stationary contact 124, movable element 121 and its associated *c* contact, stationary element 122*b*, conductor 123*b* to output circuit 93.

Bursts of signal frequency $f_4$ are applied to output circuit 92 over the following path: input circuit 54, stationary contact 126*d*, movable element 125*a*, stationary contact 126*c*, conductor 176, stationary element 146*a*, movable element 145*a*, stationary contact 146*d*, conductor 179, stationary contact 116*a*, movable element 115*a*, stationary contact 116*b*, conductor 178, stationary element 114, movable element 111 and its associated *a* contact, stationary element 112*c*, conductor 113*c* to output circuit 92.

Encoding signal components of frequency $f_5$ are applied to output circuit 94 over the following path: input circuit 55, stationary contact 156*d*, movable element 155*a*, stationary element 156*a*, conductor 174, stationary contact 136*c*, movable element 135*b*, stationary contact 136*d*, conductor 175, stationary element 118*b*, movable element 117, stationary contact 118*a*, conductor 183, stationary element 144, movable element 141 and its associated *b* contact, stationary contact 142*a*, conductor 143*a* to output circuit 94.

Finally, bursts of signal frequency $f_6$ are supplied to output circuit 93 over the following circuit: input circuit 56, stationary contact 166*d*, movable element 165*b*, stationary contact 166*c*, conductor 172, stationary contact 156*b*, movable element 155*b*, stationary contact 156*c*, conductor 171, stationary element 166*b*, movable element 165*a*, stationary contact 166*a*, conductor 173, stationary contact 146*c*, movable element 145*b*, stationary contact 146*b*, conductor 185, stationary contact 164, movable element 161 and its associated *a* contact, stationary element 162*b*, conductor 163*b* to output circuit 93.

It is thus seen that encoding signal components $f_4$, $f_3$, $f_2$, $f_5$, $f_1$, $f_6$ appear respectively at the movable elements of transition switches 110*a*, 120*a*, 130*a*, 140*a*, 150*a*, and 160*a* for respective application to output circuits 92, 93, 91, 94, 91, 93.

It should now be apparent that by utilizing all of the effective positions of the switch assemblies, it is possible to establish an extremely large number of circuit conditions between the input and output circuits. However, to emphasize the transposing feature of the invention, it may be helpful to assume that only one digit in the previously considered code combination is changed; for example, assume that the combination is CK8582 rather than CK4582. It will be noted that the movable elements of the various transition switches are still connected to the same output circuits as in the previously described setting, and this includes the movable element of transition switch 130*a* since an adjustment to position 8 of this switch establishes a connection to stationary contact 132*d* over contact *b* of the movable element rather than contact *a* as in the immediately preceding example. The new position of switch assembly 130 also establishes interconnections between stationary contacts 136*a* and 136*d* over movable element 135*a* and between stationary contacts 136*b* and 136*c* over movable element 135*b*. It will now be demonstrated that even though the various transition switches are still connected to the same output circuits, by changing just one digit the appearance of two of the signal components will be interchanged or transposed at the transition switches.

Specifically, bursts of signal frequency $f_2$ are now applied to the movable element of transition switch 140*a* over the following path: input circuit 52, stationary element 129*a*, movable element 129, stationary contact 129*b*, conductor 182, stationary element 136*a*, movable element 135*a*, stationary contact 136*d*, conductor 175, stationary contact 118*b*, movable element 117, stationary contact 118*a*, conductor 183, stationary contact 144 to the movable element 141 of transition switch 140*a*. Encoding signal components $f_5$ now appear at transition switch 130*a* by means of the following circuitry: input circuit 55, stationary element 156*d*, movable element 155*a*, stationary contact 156*a*, conductor 174, stationary element 136*c*, movable element 135*b*, stationary element 136*b*, conductor 181, stationary contact 134 to movable element 131. The previously traced circuits from input circuits 51, 53, 54 and 56, to transition switches 150*a*, 120*a*, 110*a*, and 160*a*, respectively, remain unchanged. It is thus shown that with the combination CK8582, encoding components $f_4$, $f_3$, $f_5$, $f_2$, $f_1$, $f_6$ appear respectively at transition switches 110*a*, 120*a*, 130*a*, 140*a*, 150*a*, 160*a*, for respective application to output circuits 92, 93, 91, 94, 91, 93, as compared to the previously described order of appearance $f_4$, $f_3$, $f_2$, $f_5$, $f_1$, $f_6$ at transition switches 110*a*–160*a* in the previous example with the code combination CK4582. Thus, encoding components $f_2$ and $f_5$ are interchanged or transposed by merely changing a single digit in the code combination.

It should be appreciated that even though there are only six input circuits which are interconnected in various combinations to four output circuits, giving rise to $4^6$ or 4,096 real codes, because of the complexity of the transposition arrangement there are 16×16×8×8×8×8 or 1,048,576 apparent codes. There are therefore over a million different ways that this encoding apparatus may be set up. It is thus extremely difficult if not impossible for a person having the proper encoding equipment but not the switch setting information to attempt to arrive at the proper code combination for any particular subscription telecast by means of a trail and error method. Of course, many additional switches and/or input and output circuits may be employed to increase the odds against setting up the right combination by chance; however, the arrangement as shown in Figure 2 renders a sufficient degree of security and yet is very economical to produce and easy to adjust.

The embodiment illustrated in Figures 3–5 provides a transposition mechanism having substantially similar secrecy characteristics as the mechanism of Figure 2, but yet is simpler and more economical in construction. Briefly, the principal portions of the transition and transposition switches and the interconnecting circuits may be formed of well-known printed circuits and each pair of associated switches may be mounted concentrically with respect to each other on an insulating support, such as a layer of Bakelite or plastic. The remaining portions of the transition and transposition switches may comprise rotatable contacts. With such an arrangement, all of the desired transposition patterns may be established with a relatively simple apparatus.

More specifically, the transition and transposition switches preferably take the form of manually operated 10-point rotary printed-circuit switch assemblies 210, 220, 230, 240, 250, and 260, mounted or rather "printed" on a common insulating panel or surface 281. The transition section of each assembly 210–260 comprises: a semi-circular stationary contact (213*a*, 223*a*, 233*a*, 243*a*, 253*a*, 263*a*, respectively) which is connected to an assigned one of the input circuits, namely, contact 213*a* is connected to input circuit 51, contact 223*a* is connected to input circuit 52, contact 233*a* is connected to input circuit 53, contact 243*a* is connected to input circuit 54, contact 253*a* is connected to input circuit 55, and contact 263*a* is connected to input circuit 56; a series of stationary contacts (212*a*–212*e*, 222*a*–222*e*, 232*a*–232*e*, 242*a*–242*e*, 252*a*–252*e*, 262*a*–262*e*, respectively) connected by way of conductors 216*a*–216*e*, 226*a*–226*e*, 236*a*–236*e*, 246*a*–246*e*, 256*a*–256*e*, 266*a*–266*e*, respectively, to common output circuits 94', 94, 93, 92, 91; and a movable contact element (214, 224, 234, 244, 254, 264, respectively) having three angularly spaced contacts *a*, *b* and *c*, *a* and *c* adapted to establish an electrical connection with selected ones of stationary contacts 212*a*–212*e*, 222*a*–222*e*, 232*a*–232*e*, 242*a*–242*e*, 252*a*–252*e*, 262*a*–262*e*, respectively, and contact *b* adapted to establish an electrical connection with either stationary contact 213*a*, 223*a*, 233*a*, 243*a*, 253*a*, 263*a*, respectively, or a semi-circular transfer element 213*b*, 223*b*, 233*b*, 243*b*, 253*b*, 263*b*, respectively, discussed hereinafter in connection with transposition apparatus, depending on the instantaneous setting of each transition switch. It will be noted that an additional output circuit, namely 94', is provided in this embodiment in order to increase the number of possible switch setting combinations. When the transposition mechanism is utilized in the subscription system shown in Figure 1, additional output circuit 94' may be grounded as is output circuit 94.

The transposition portion of each switch assembly 210–260 comprises: a circular stationary transfer element (211, 221, 231, 241, 251, 261, respectively); the semi-circular stationary transfer element (213*b*, 223*b*, 233*b*, 243*b*, 253*b*, 263*b*, respectively); and a movable transfer element (215, 225, 235, 245, 255, 265, respectively) having an *a* contact adapted to establish an electrical connection with the circular stationary transfer element (211, 221, 231, 241, 251, 261, respectively) and a *b* contact adapted to establish an electrical connection with either the semicircular contact element (213*a*, 223*a*, 233*a*, 243*a*, 253*a*, 263*a*, respectively) or the semicircular transfer element (213*b*, 223*b*, 233*b*, 243*b*, 253*b*, 263*b*, respectively) depending on the instantaneous position of the movable element.

Uni-control mechanism is provided for concurrently operating each of the movable transfer elements with the movable contact elements of its assigned transition switch. In the embodiment shown in Figures 3–5, this mechanism comprises a series of supporting structures, which may be constructed of some insulating material such as plastic, one structure for each switch assembly to mechanically interconnect movable contact element 214 with movable transfer element 215, movable element 224 with movable element 225, element 234 with element 235, element 244 with element 245, element 254 with element 255, and movable contact element 264 with movable transfer element 265, as indicated by the broken lines between such pairs. With this arrangement, when any one of the switch assemblies 210–260 is manually adjusted to position the transition section, a repositioning of the associated transposition switch is effected. The actual physical construction of the rotating component of each of the similar switch assemblies may be as illustrated in Figure 4. The three movable transition contacts *a*, *b* and *c* included in each rotating component are electrically connected together to form one integral metallic element 282. Likewise, the movable transfer contacts *a* and *b* of each rotating component are electrically connected together to form an integral metallic element 283. Elements 282 and 283 are mounted on an insulating support 284 in spaced-apart relation by means of rivets 285, and the entire assembly may be rotatably supported with the movable contacts engaging the stationary contact elements in the manner schematically indicated in Figure 3.

Circuit means is provided for connecting the stationary transfer elements in circuit relation with stationary contact elements of the transition switches effectively to channel the input circuits to other transition switches upon operation of the transposition switches. In the illustration, these connections include a connection 271 between stationary transfer elements 211 and 223*b*, a connection 272 from stationary transfer element 221 to stationary transfer element 233*b*, a connection 273 between elements 231 and 243*b*, a connection 274 between elements 241 and 253*b*, a connection 275 between stationary transfer elements 251 and 263*b*, and a connection 276 between transfer elements 261 and 213*b*.

Before describing the patterns of interconnections established by different switch settings, it might be well to analyze briefly the function of any one of the switch assemblies as its movable element is rotated through each one of the ten positions, with particular reference to Figure 5 which illustrates the orientation of the various movable contacts in each of the ten positions. It will be observed that if the movable contacts are rotated such that contact *a* of the associated transition movable element (214–264) is positioned to 6, 7, 8, 9 or 10, in the case of switch assemblies 230–260, or F, G, H, J, or K, in the case of switch assemblies 210–220, each input circuit is connected directly to one of the output circuits through its assigned transition switch. For example, assume that the rotatable contacts of switch assembly 210 are positioned such that contact 214*a* points to letter or indicium H. Input circuit 51 is then connected to output circuit 94 over the following path: input circuit 51, stationary element 213*a*, movable contact elements 214*b* and 214*c*, stationary element 212*b*, conductor 216*b* to output circuit 94. If all six switch assemblies are positioned to some setting between 6 and 10 or letters F–K, each input circuit is connected through its assigned transition switch directly to a selected output circuit. However, if some of the switches are positioned to 1, 2, 3, 4 or 5 in the case of switch assemblies 230–260, or positions A, B, C, D or E in the case of switch assemblies 210–220, a transposition or transfer of the channeling of the input circuits to other transition switches occurs.

In order to fully understand the manner in which this channeling is transferred, assume once again that each of the switch assemblies 210–260 is adjusted to one of the positions 6–10 or F–K. A "loop" circuit may then be traced over the transfer elements as follows: stationary transfer element 213*b*, contact 215*b* of movable transfer element 215, contact 215*a*, stationary transfer element 211, conductor 271, stationary transfer element 223*b*, movable transfer contact 225*b*, movable transfer contact 225*a*, stationary transfer contact 221, conductor 272, element 233*b*, contacts 235*b*, 235*a*, element 231, conductor 273, element 243*b*, contacts 245*b*, 245*a*, element 241, conductor 274, element 253*b*, contacts 255*b*, 255*a*, element 251, conductor 275, element 263*b*, contacts 265*b*, 265*a*, element 261, conductor 276 back to transfer element 213*b*.

If any two or more of these switches are now readjusted to positions from 1–5 or A–E, this "loop" circuit is opened and the input circuits assigned to the readjusted switches are connected over part of the loop to different transition switches. To illustrate, assume that switch assembly 210 is positioned to E, assembly 230 is positioned to 2, assemblies 240–260 are positioned to 10 and assembly 220 is positioned to K. The input circuit 51 assigned to the transition switch section of assembly 210 is now transferred to the transition switch of assembly 230 and thence to output circuit 94′ over the following path: input circuit 51, element 213*a*, contacts 215*b*, 215*a*, element 211, conductor 271, elements 223*b*, contacts 225*b*, 225*a*, element 221, conductor 272, element 233*b*, contacts 234*b*, 234*a*, 232*a*, conductor 236*a* to output circuit 94′. At the same time, the input circuit 53 assigned to the transition switch section of assembly 230 is transferred to the transition switch of assembly 210 and finally to output circuit 92 via the following circuit: input circuit 53, element 233*a*, contacts 235*b*, 235*a*, element 231, conductor 273, element 243*b*, contacts 245*b*, 245*a*, element 241, conductor 274, element 253*b*, contacts 255*b*, 255*a*, element 251, conductor 275, element 263*b*, contacts 265*b*, 265*a*, element 261, conductor 276, element 213*b*, contacts 214*b*, 214*a*, 212*d*, conductor 216*d* to output circuit 92.

Consideration will now be given to some illustrative switch settings in order to demonstrate further the transposing feature of the embodiment of Figures 3–5. Assume initially that the particular code combination for a given television program is KJ 7678. For effecting proper decoding, switch assembly 210 is manually rotated to position K, resulting in the electrical connection of movable element 214 to stationary element 212*d* and to stationary element 213*a* over its associated *c* and *b* contacts, respectively, and also a connection between stationary elements 213*b* and 211 over movable transfer element 215. Switch assembly 220 is rotated to position J, thereby establishing an electrical connection between movable element 224 and stationary elements 222*c* and 223*a* over contacts 224*c* and 224*b*, respectively, and also a connection between stationary elements 223*b* and 221 over movable transfer element 225. Switch assembly 230 is adjusted by the subscriber to position 7, thereby effecting a connection between movable contact 234 and stationary elements 232*a* and 233*a* over its associated *c* and *b* contacts, respectively, and also a connection between stationary elements 233*b* and 231 over movable transfer element 235.

Switch assembly 240 is next rotated to position 6, thereby establishing a connection from movable contact 244 to stationary elements 242*e* and 243*a* through its associated *a* and *b* contacts, respectively, and also a connection between stationary elements 243*b* and 241 over movable transfer element 245. Switch assembly 250 is adjusted to position 7, resulting in the establishment of a connection from movable element 254 to stationary elements 252*a* and 253*a* through contacts 254*c* and 254*b*, respectively, and also a connection between elements 253*b* and 251 over movable element 255. Finally, to complete the switch setting, assembly 260 is manually rotated to position 8, resulting in the establishment of a connection between movable element 264 and stationary elements 262*b* and 263*a* over its *c* and *b* contacts, respectively, and also a connection between elements 263*b* and 261 over movable transfer element 265.

With this illustrative combination, bursts of signal frequency $f_1$ are supplied to switch assembly 210 for application to output circuit 92 over the following path: input circuit 51, stationary element 213*a*, movable contacts 214*b* and 214*c*, stationary element 212*d*, conductor 216*d* to output circuit 92. Signal components of frequency $f_2$ are supplied to output circuit 93 via the following circuit: input circuit 52, stationary element 223*a*, movable contacts 224*b* and 224*c*, stationary element 222*c*, conductor 226*c* to output circuit 93. Encoding signal components of frequency $f_3$ are supplied to output circuit 94′ over the following circuit: input circuit 53, stationary element 233*a*, movable contacts 234*b* and 234*c*, stationary element 232*a*, conductor 236*a* to output circuit 94′. Bursts of signal frequency $f_4$ are applied to output circuit 91 over the following path: input circuit 54, stationary element 243*a*, movable contacts 244*b*, and 244*a*, stationary element 242*e*, conductor 246*e* to output circuit 91. Encoding signal components of frequency $f_5$ are applied to output circuit 94′ over the following path: input circuit 55, stationary element 253*a*, movable contacts 254*b* and 254*c*, stationary element 252*a*, conductor 256*a* to output circuit 94′. Finally, bursts of signal frequency $f_6$ are supplied to output circuit 94 over the following circuit: input circuit 56, stationary element 263*a*, movable contacts 264*b* and 264*c*, stationary contact 262*b*, conductor 266*b* to output circuit 94.

It is thus seen that encoding signal components $f_1$, $f_2$, $f_3$, $f_4$, $f_5$, $f_6$ appear respectively at the movable contact elements of the transition sections of switch assemblies 210, 220, 230, 240, 250 and 260 for respective application to output circuits 92, 93, 94′, 91, 94′, 94. Since all of the switches are positioned to either 6–10 or F–K, the input circuits are connected directly through their assigned transition switches to the output circuits without any transposing.

Assume now that the code combination is changed to BJ 3578 rather than KJ 7678 and that therefore three of the switches are positioned to a letter designation A–E or a number less than 6. Specifically, switch assembly 210 is repositioned to B to establish an electrical connection between stationary elements 213*b* and 212*a* via movable contacts 214*b* and 214*a*, and stationary elements 213*a* and 211 are connected together by means of movable contact 215. Switch assembly 230 is readjusted to position 3 to establish an electrical connection between stationary elements 233*b* and 232*b* via contacts *b* and *a* of movable element 234, and stationary elements 233*a* and 231 are connected together by means of movable transfer element 235. Switch assembly 240 is repositioned to position 5, resulting in the establishment of an electrical connection between stationary elements 243*b* and 242*d* via movable contacts 244*b* and 244*a*, and stationary elements 243*a* and 241 are connected together by means of movable element 245.

With this combination, bursts of signal frequency $f_1$ are now applied to the movable contact elements of the transition switch of assembly 230 and thence to output circuit 94 over the following circuit: input circuit 51, stationary contact 213*a*, movable contacts 215*b* and 215*a*, stationary transfer element 211, conductor 271, stationary transfer element 223*b*, movable transfer contacts 225*b* and 225*a*, stationary transfer element 221, conductor 272, stationary transfer element 233*b*, movable contacts 234*b* and 234*a*, stationary contact 232*b*, conductor 236*b* to output circuit 94. Encoding signal components $f_3$ now appear at the transition section of assembly 240 for application to output circuit 92 over the following path: input circuit 53, stationary element 233*a*, movable transfer contacts 235*b* and 235*a*, stationary transfer element 231, conductor 273, stationary transfer element 243*b*, movable elements 244*b* and 244*a*, stationary element 242*d*, conductor 246*d* to output circuit 92.

Bursts of signal frequency $f_4$ are supplied to the transition switch of assembly 210 for application to output circuit 94' over the following circuit: input circuit 54, stationary element 243*a*, movable transfer contacts 245*b* and 245*a*, stationary transfer element 241, conductor 274, stationary element 253*b*, movable contacts 255*b* and 255*a*, stationary element 251, conductor 275, stationary element 263*b*, movable contacts 265*b* and 265*a*, stationary element 261, conductor 276, stationary element 213*b*, movable contacts 214*b* and 214*a*, stationary element 212*a*, conductor 216*a* to output circuit 94'. The previously traced circuits from input circuits 52, 55 and 56, to the transition sections of assemblies 220, 250, and 260, respectively, remain unchanged.

It is thus apparent that with the combination BJ 3578, encoding signal components $f_1$, $f_2$, $f_3$, $f_4$, $f_5$, $f_6$ appear respectively at the transition portions of assemblies 230, 220, 240, 210, 250, 260, for respective application to output circuits 94, 93, 92, 94', 94', and 94, as compared to the order of appearance of signal components $f_1$–$f_6$ at the transition switches of assemblies 210–260 in the previous example with the code combination KJ 7678. Thus, by changing three of the six switch settings, the channeling of input circuit 51 has been shifted to assembly 230, the channeling of input circuit 53 has been transferred to assembly 240, and the channeling of input circuit 54 has been transferred to the transition switch of assembly 210.

The invention provides, therefore, a transposition mechanism for the encoding apparatus of a subscription television system, which mechanism is relatively simple in construction while being capable of establishing an extremely large number of code combinations.

While particular embodiments of the invention have been shown and described, modifications may be made, and it is intended in the appended claims to cover all such modifications as may fall within the true spirit and scope of the invention.

I claim:

1. An encoding apparatus for a subscription television system including a plurality of input circuits and a plurality of output circuits, said encoding apparatus comprising: a plurality of transition switches, individually having a plurailty of operating positions, connected to said input circuits and to said output circuits and in each of said positions establishing predetermined circuit conditions between selected ones of said input and output circuits; a plurality of transposition switches individually having a plurality of operating positions; unicontrol mechanism for concurrently operating each of said transposition switches with an assigned one of said transition switches; and a plurality of continuous circuit connections, each of which includes at least one of said transposition switches in series with at least one of said transition switches, between said input and output circuits to modify said predetermined circuit conditions in accordance with the transposition pattern of said transposition switches.

2. An encoding apparatus for a subscription television system including a plurality of input circuits and a plurality of output circuits, said encoding apparatus comprising: a plurality of multi-position transition switches connected to said input circuits and to said output circuits, each of said transition switches in at least some positions establishing predetermined circuit conditions between a predetermined one of said input circuits and a selected one of said output circuits; a plurality of transposition switches individually having a plurality of operating positions; uni-control mechanism for concurrently operating each of said transposition switches with an assigned one of said transition switches; and a plurality of continuous circuit connections, each of which includes at least one of said transposition switches in series with at least one of said transition switches, between said input and output circuits effectively to channel said predetermined ones of said input circuits to different transition switches thereby to modify said predetermined circuit conditions in accordance with the transposition pattern of said transposition switches.

3. An encoding apparatus for a subscription television system including a plurality of input circuits and a plurality of output circuits, said encoding apparatus comprising: a plurality of transition switches, individually having a plurality of operating positions, connected to said input circuits and to said output circuits and in each of said positions establishing predetermined circuit conditions between selected ones of said input and output circuits; a plurality of transposition switches, individually having a plurality of operating positions, connected to said input circuits; uni-control mechanism for concurrently operating each of said transposition switches with an assigned one of said transition switches; and a plurality of continuous circuit connections, each of which includes at least one of said transposition switches in series with at least one of said transition switches, between said input and output circuits to modify said predetermined circuit conditions in accordance with the transposition pattern of said transposition switches.

4. An encoding apparatus for a subscription television system including a plurality of input circuits and a plurality of output circuits, said encoding apparatus comprising: a plurality of transition switches, individually having a plurality of operating positions, connected to said input circuits and to said output circuits and in each of said positions establishing predetermined circuit conditions between selected ones of said input and output circuits; a plurality of transposition switches, individually having a plurality of operating positions, connected to said input circuits; uni-control mechanism for concurrently operating an assigned plurality of said transposition switches with an assigned one of said transition switches; and a plurality of continuous circuit connections, each of which includes at least one of said transposition switches in series with at least one of said transition switches, between said input and output circuits to modify said predetermined circuit conditions in accordance with the transposition pattern of said transposition switches.

5. An encoding apparatus for a subscription television system including a plurality of input circuits and a plurality of output circuits, said encoding apparatus comprising: a plurality of multi-position transition switches each having at least one element connected to a selected one of said input circuits and at least one other element connected to an assigned one of said output circuits and in each position establishing predetermined circuit conditions between selected ones of said input and output circuits; a plurality of transposition switches, individually having a plurality of operating positions, connected to said input circuits; uni-control mechanism for concurrently operating each of said transposition switches with an assigned one of said transition switches; and a plurality of continuous circuit connections, each of which includes at least one of said transposition switches in series with at least one of said transition switches, between said input and output circuits to transpose said predetermined circuit conditions in accordance with the transposition pattern of said transposition switches.

6. An encoding apparatus for a subscription television system including a plurality of input circuits and a plurality of output circuits, said encoding apparatus comprising: a plurality of multi-position transition switches each having a movable element connected to a selected one of said input circuits and a multiplicity of stationary elements individually connected to an assigned one of said output circuits and in each position establishing predetermined circuit conditions between selected ones of said input and output circuits; a plurality of transposition switches, individually having a plurality of operating positions, connected to said input circuits; uni-control mechanism for concurrently operating each of said transposition switches with an assigned one of said transition switches; and a plurality of continuous circuit connections, each of which includes at least one of said transposition switches in series with at least one of said transition switches, between said input and output circuits to transpose said predetermined circuit conditions in accordance with the transposition pattern of said transposition switches.

7. An encoding apparatus for a subscription television system including a plurality of input circuits and a plurality of output circuits, said encoding apparatus comprising: a plurality of multi-position transition switches each having a movable element connected to a selected one of said input circuits and a multiplicity of stationary elements individually connected to an assigned one of said output circuits and in each position establishing predetermined circuit conditions between selected ones of said input and output circuits; a plurality of multi-position transposition switches individually having at least one stationary element connected to a selected one of said input circuits; uni-control mechanism for concurrently operating each of said transposition switches with an assigned one of said transition switches; and a plurality of continuous circuit connections, each of which includes at least one of said transposition switches in series with at least one of said transition switches, and said transition switches for transposing said predetermined circuit conditions in accordance with the transposition pattern of said transposition switches.

8. An encoding apparatus for a subscription television system including a plurality of input circuits and a plurality of output circuits, said encoding apparatus comprising: a plurality of multi-position transition switches each having a movable element connected to a selected one of said input circuits and a multiplicity of stationary elements individually connected to an assigned one of said output circuits and in each position establishing predetermined circuit conditions between selected ones of said input and output circuits; a plurality of multi-position transposition switches individually having at least one stationary element connected to a selected one of said input circuits and at least one other stationary element connected to another one of said transposition switches, said transposition switches also individually having a movable element adapted to electrically interconnect the associated stationary elements in accordance with the instantaneous positions of said transposition switches; uni-control mechanism for concurrently operating each of said transposition switches with an assigned one of said transition switches; and a plurality of continuous circuit connections, each of which includes at least one of said transposition switches in series with at least one of said transition switches, for transposing said predetermined circuit conditions in accordance with the transposition pattern of said transposition switches.

9. An encoding apparatus for a subscription television system including a plurality of input circuits and a plurality of output circuits, said encoding apparatus comprising: a plurality of multi-position transition switches each having a movable element connected to a selected one of said input circuits and a multiplicity of stationary elements individually connected to an assigned one of said output circuits and in each position establishing predetermined circuit conditions between selected ones of said input and output circuits; a plurality of multi-position transposition switches individually having at least one stationary element connected to a selected one of said input circuits and at least one other stationary element connected to another one of said transposition switches, said transposition switches also individually having a movable element adapted to electrically interconnect the associated stationary elements in accordance with the instantaneous positions of said transposition switches; uni-control mechanism for concurrently operating each of said transposition switches with an assigned one of said transition switches; and a plurality of continuous circuit connections, each of which includes a stationary element of at least one of said transposition switches in series with the movable element of at least one of said transition switches, to modify said predetermined circuit conditions in accordance with the transposition pattern of said transposition switches.

10. An encoding apparatus for a subscription television system including a plurality of input circuits and plurality of output circuits, said encoding apparatus comprising: a plurality of multi-position rotatable transition switches each having a movable element connected to a selected one of said input circuits and a multiplicity of stationary elements individually connected to an assigned one of said output circuits and in each position establishing predetermined circuit conditions between selected ones of said input and output circuits, each of said transition switches being adapted to electrically connect its associated movable element to any one of its associated stationary elements in a plurality of different positions; a plurality of multi-position rotatable transposition switches individually having at least one stationary element connected to a selected one of said input circuits, at least one other stationary element connected to another selected one of said input circuits, and at least one further stationary element connected to another one of said transposition switches, each of said transposition switches being adapted to electrically interconnect said last-mentioned stationary element with either one of said first two-mentioned stationary elements in any one of a plurality of positions; uni-control mechanism for concurrently operating each of said transposition switches with an assigned one of said transition switches; and a plurality of continuous circuit connections, each of which includes at least one of said transposition switches in series with at least one of said transition switches, for transposing said predetermined circuit conditions in accordance with the instantaneous positions of said transposition switches.

11. An encoding apparatus for a subscription television system including a plurality of input circuits and a plurality of output circuits, said encoding apparatus comprising: a plurality of multi-position rotatable transition switches each having a movable element connected to a selected one of said input circuits and a multiplicity of stationary contacts individually connected to an assigned one of said output circuits and in each position establishing predetermined circuit conditions between selected ones of said input and output circuits, each of said transition switches being adapted to electrically connect its associated movable element to any one of its associated stationary contacts in a plurality of different positions; a plurality of multi-position rotatable transposition switches individually having at least one stationary contact connected to a selected one of said input circuits, at least one other stationary contact connected to another selected one of said input circuits, and at least one further stationary contact connected to another one of said transposition switches, each of said transposition switches being adapted to electrically interconnect said last-mentioned stationary contact with either one of said first two-mentioned stationary contacts in any one of a plurality of positions; uni-control switch shafts for concurrently operating certain ones of said transposition switches with assigned ones of said transition switches and for further concurrently operating an assigned plurality of said transposition switches with an assigned one of said transition switches; and a plurality of continuous circuit connections, each of which includes at least one of said transposition switches in series with at least one of said transition switches, for transposing said predetermined circuit conditions in accordance with the instantaneous positions of said transposition switches.

12. An encoding apparatus for a subscription television system including a plurality of input circuits and a plurality of output circuits, said encoding apparatus comprising: a plurality of transition switches individually having a plurality of operating positions, each of said transition switches being connected to an assigned one of said input circuits and to said plurality of output circuits and in certain ones of said positions selectively establishing predetermined circuit connections between the assigned input circuit and a selected one of said output circuits; a plurality of transposition switches individually having a plurality of operating positions; uni-control mechanism for concurrently operating each of said transposition switches with an assigned one of said transition switches; and a plurality of continuous circuit connections, each of which includes at least one of said transposition switches in series with at least one of said transition switches, effectively to channel said input circuits to other transition switches upon operation of said transposition switches thereby to modify said predetermined circuit connections in accordance with the transposition pattern of said transposition switches.

13. An encoding apparatus for a subscription television system including a plurality of input circuits and a plurality of output circuits, said encoding apparatus comprising: a plurality of multi-position transition switches individually comprising stationary contact elements and movable contact elements, each of said transition switches being connected to an assigned one of said input circuits and to said plurality of output circuits and in certain positions selectively establishing predetermined circuit connections between the assigned input circuit and a selected one of said output circuits; a plurality of transposition switches individually having a plurality of operating positions; uni-control mechanism for concurrently operating each of said transposition switches with an assigned one of said transition switches; and a plurality of continuous circuit connections, each of which includes at least one of said transposition switches in series with a contact element of at least one of said transition switches, effectively to channel said input circuits to other transition switches upon operation of said transposition switches thereby to modify said predetermined circuit connections in accordance with the transposition pattern of said transposition switches.

14. An encoding apparatus for a subscription television system including a plurality of input circuits and a plurality of output circuits, said encoding apparatus comprising: a plurality of transition switches individually comprising stationary contact elements and movable contact elements and having a plurality of operating positions, each of said transition switches being connected to an assigned one of said input circuits and to said plurality of output circuits and in certain ones of said positions selectively establishing predetermined circuit connections between the assigned input circuit and a selected one of said output circuits; transposition apparatus including a plurality of stationary transfer elements individually associated with an assigned one of said transition switches, and a plurality of movable transfer elements also individually associated with an assigned one of said transition switches; uni-control mechanism for concurrently operating each of said movable transfer elements with the movable contact elements of the assigned transition switch; and circuit means series connecting said stationary transfer elements in circuit relation with stationary contact elements of said transition switches effectively to channel said input circuits to other transition switches upon operation of said transposition apparatus thereby to modify said predetermined circuit connections in accordance with the transposition pattern of said transposition apparatus.

15. An encoding apparatus for a subscription television system including a plurality of input circuits and a plurality of output circuits, said encoding apparatus comprising: a plurality of multi-position transition switches comprising stationary contact elements and movable contact elements, each of said transition switches having a stationary contact element connected to an assigned one of said input circuits, another stationary contact element connected to an assigned one of said output circuits, and a movable contact element adapted to establish in one position a circuit connection between the assigned input and output circuits; transposition apparatus including a plurality of stationary transfer elements individually associated with an assigned one of said transition switches and a plurality of movable transfer elements also individually associated with an assigned one of said transition switches; uni-control mechanism for concurrently operating each of said movable transfer elements with the movable contact elements of the assigned transition switch; and circuit means series connecting said stationary transfer elements in circuit relation with stationary contact elements of said transition switches effectively to channel said input circuits to other transition switches upon operation of said transposition apparatus thereby to modify said predetermined circuit connections in accordance with the transposition pattern of said transposition apparatus.

16. An encoding apparatus for a subscription television system including a plurality of input circuits and a plurality of output circuits, said encoding apparatus comprising: a plurality of multi-position transition switches comprising stationary contact elements and movable contact elements, each of said transition switches having a stationary contact element connected to an assigned one of said input circuits, a multiplicity of stationary contact elements individually connected to an assigned one of said output circuits, and a movable contact element adapted to establish in each position a predetermined circuit connection between the assigned input circuit and a selected one of said output circuits; transposition apparatus including a plurality of stationary transfer elements individually associated with an assigned one of said transition switches and a plurality of movable transfer elements also individually associated with an assigned one of said transition switches; uni-control mechanism for concurrently operating each of said movable transfer elements with the movable contact elements of the assigned transition switch; and circuit means series connecting said stationary transfer elements in circuit relation with stationary contact elements of said transition switches effectively to channel said input circuits to other transition switches upon operation of said transposition apparatus thereby to modify said predetermined circuit connections in accordance with the transposition pattern of said transposition apparatus.

17. An encoding apparatus for a subscription television system including a plurality of input circuits and a plurality of output circuits, said encoding apparatus comprising: a plurality of multi-position transition switches comprising stationary contact elements and movable contact elements, each of said transition switches having a stationary contact element connected to an assigned one of said input circuits, a multiplicity of stationary contact elements individually connected to an assigned one of said output circuits, and a movable contact element adapted to establish in each position a predetermined circuit connection between the assigned input circuit and a selected one of said output circuits; multi-position transposition apparatus including a plurality of stationary transfer elements individually associated with an assigned one of said transition switches, and a plurality of movable transfer elements also individually associated with an assigned one of said transition switches, each of said stationary transfer elements being connected to a stationary transfer element associated with a different transition switch; uni-control mechanism for concurrently operating each of said movable transfer elements with the movable contact elements of the assigned transition switch; and circuit means series connecting said stationary transfer elements in circuit relation with stationary contact elements of said transition switches effectively to channel said input circuits to other transition switches upon operation of said transposition apparatus thereby to modify said predetermined circuit connections in accordance with the transposition pattern of said transposition apparatus.

18. An encoding apparatus for a subscription television system including a plurality of input circuits and a plurality of output circuits, said encoding apparatus comprising: a plurality of multi-position transition switches comprising stationary contact elements and movable contact elements, each of said transition switches having a stationary contact element connected to an assigned one of said input circuits, a multiplicity of stationary contact elements individually connected to an assigned one of said output circuits, and a movable contact element adapted to establish in each position a predetermined circuit connection between the assigned input circuit and a selected one of said output circuits; a plurality of multi-position transposition switches individually having at least two stationary transfer elements, each stationary transfer element being connected to a stationary transfer element associated with a different transposition switch, said transposition switches also individually having a movable transfer element adapted to interconnect electrically the two associated stationary elements in certain ones of the positions of said transposition switches; uni-control mechanism for concurrently operating each of said transposition switches with an assigned one of said transition switches; and circuit means series connecting said stationary transfer elements in circuit relation with stationary contact elements of said transition switches effectively to channel said input circuits to other transition switches upon operation of said transposition switches thereby to modify said predetermined circuit connections in accordance with the transposition pattern of said transposition switches.

19. An encoding apparatus for a subscription television system including a plurality of output circuits, said encoding apparatus comprising: a plurality of multi-position rotatable transition switches comprising stationary contact elements and movable contact elements, each of said transition switches having a stationary contact element connected to an assigned one of said input circuits, a multiplicity of stationary contact elements individually connected to an assigned one of said output circuits, and a movable contact element adapted to establish in each position a predetermined circuit connection between the assigned input circuit and a selected one of said output circuits; a plurality of multi-position rotatable transposition switches individually having at least two stationary transfer elements one of which is concentrically positioned with respect to the other and also with respect to the stationary contact elements of an associated transition switch, each stationary transfer element being connected to a stationary transfer element associated with a different transposition switch; uni-control mechanism for concurrently operating each of said transposition switches with an assigned one of said transition switches; and circuit means series connecting said stationary transfer elements in circuit relation with stationary contact elements of said transition switches effectively to channel said input circuits to other transition switches upon operation of said transposition switches thereby to modify said predetermined circuit connections in accordance with the transposition pattern of said transposition switches.

20. An encoding apparatus for a subscription television system including a plurality of input circuits and a plurality of output circuits, said encoding apparatus comprising: a plurality of transition switches individually having a plurality of operating positions, each of said transition switches being connected to an assigned one of said input circuits and to said plurality of output circuits and in certain ones of said positions selectively establishing predetermined circuit connections between the assigned input circuit and a selected one of said output circuits; a plurality of transposition switches individually having a plurality of operating positions each of which corresponds to an operating position of one of said transition switches; uni-control mechanism for concurrently operating each of said transposition switches with an assigned one of said transition switches, each of said transposition switches being ineffective in operating positions corresponding to said certain ones of said operating positions of its assigned transition switch; and a plurality of continuous circuit connections, each of which includes at least one of said transposition switches in series with at least one of said transition switches, effectively to channel said input circuits to other transition switches upon concurrent operation of said transposition switches and transition switches to operating positions other than said certain ones, thereby to modify said predetermined circuit connections in accordance with the transposition pattern of said transposition switches.

References Cited in the file of this patent

UNITED STATES PATENTS

| | | |
|---|---|---|
| 2,414,101 | Hogan et al. | Jan. 14, 1947 |
| 2,539,556 | Steinberg | Jan. 30, 1951 |
| 2,554,507 | Smith | May 29, 1951 |